US012220622B2

(12) United States Patent
Shultz et al.

(10) Patent No.: US 12,220,622 B2
(45) Date of Patent: Feb. 11, 2025

(54) SOLE-TAPES FOR GOLF CLUBS AND METHODS OF USING THE SAME

(71) Applicant: Sumitomo Rubber Industries, Ltd., Kobe (JP)

(72) Inventors: Casey Shultz, Seal Beach, CA (US); Jake Donohue, Irvine, CA (US)

(73) Assignee: Sumitomo Rubber Industries, Ltd., Kobe (JP)

( * ) Notice: Subject to any disclaimer, the term of this patent is extended or adjusted under 35 U.S.C. 154(b) by 193 days.

(21) Appl. No.: 17/878,744

(22) Filed: Aug. 1, 2022

(65) Prior Publication Data

US 2024/0033595 A1 Feb. 1, 2024

(51) Int. Cl.
*A63B 53/04* (2015.01)
*A63B 60/42* (2015.01)
*A63B 69/36* (2006.01)
*A63B 102/32* (2015.01)

(52) U.S. Cl.
CPC .......... *A63B 60/42* (2015.10); *A63B 2102/32* (2015.10); *A63B 2220/18* (2013.01); *A63B 2220/50* (2013.01)

(58) Field of Classification Search
CPC . A63B 60/42; A63B 2102/32; A63B 2220/18; A63B 2220/50; A63B 2071/0694; G06T 7/00
USPC ................ 473/201, 223, 226, 148, 331, 409
See application file for complete search history.

(56) References Cited

U.S. PATENT DOCUMENTS

| | | | | |
|---|---|---|---|---|
| 2,660,436 | A | * 11/1953 | Grossman | A63B 69/3617 346/135.1 |
| 3,754,764 | A | * 8/1973 | Manheck | A63B 69/0026 462/69 |
| 6,405,450 | B1 | * 6/2002 | Wood | A63B 53/06 33/759 |
| 6,659,775 | B1 | 12/2003 | Moy | |
| 8,057,327 | B2 | 11/2011 | Todd | |
| 8,257,191 | B2 | 9/2012 | Stites et al. | |
| 8,500,570 | B2 | 8/2013 | Stites et al. | |

(Continued)

OTHER PUBLICATIONS

Broadie, Chris, "Does Lie Tape Lie?", PING Blogs, accessed on Jun. 15, 2022, available at: https://ping.com/en-us/blogs/proving-grounds/does-lie-tape-lie.

(Continued)

*Primary Examiner* — Nini F Legesse
(74) *Attorney, Agent, or Firm* — Barry IP Law, P.C.

(57) ABSTRACT

A sole-tape includes a base material having adhesive on a first surface and corresponding to an area of a sole of a club head. A second surface of the base material includes grind-indicia corresponding to different sole grinds. A method of using a sole-tape includes affixing the sole-tape to a sole of a club head such that a longitudinal edge of the sole-tape is substantially parallel to a striking face. A width classification is determined for a mark formed on the sole-tape with the width of the mark measured in a longitudinal direction of the sole-tape. The determined width classification corresponds to a recommended sole grind. In another aspect, a mark is identified in an image or scan of a sole-tape. A width and relative location of the mark are determined, and a sole grind recommendation is determined for a golfer based on the determined width and relative location.

9 Claims, 8 Drawing Sheets

(56) References Cited

U.S. PATENT DOCUMENTS

| | | |
|---|---|---|
| 8,801,533 B2 | 8/2014 | Stites et al. |
| 9,421,429 B2 | 8/2016 | Stites et al. |
| 9,884,233 B2 | 2/2018 | Stites et al. |
| 2004/0023725 A1* | 2/2004 | Llewellyn ............ A63B 60/46 |
| | | 473/409 |
| 2008/0085779 A1* | 4/2008 | Nagai ................. A63B 53/047 |
| | | 473/331 |
| 2012/0329568 A1* | 12/2012 | Stites .................... A63B 69/36 |
| | | 473/223 |

OTHER PUBLICATIONS

Pending Design U.S. Appl. No. 29/848,326, filed Aug. 1, 2022, titled "Sole-Tape for Golf Club Head", Casey Shultz et al.

* cited by examiner

SOLE-TAPES FOR GOLF CLUBS AND METHODS OF USING THE SAME

BACKGROUND

Figure 1:
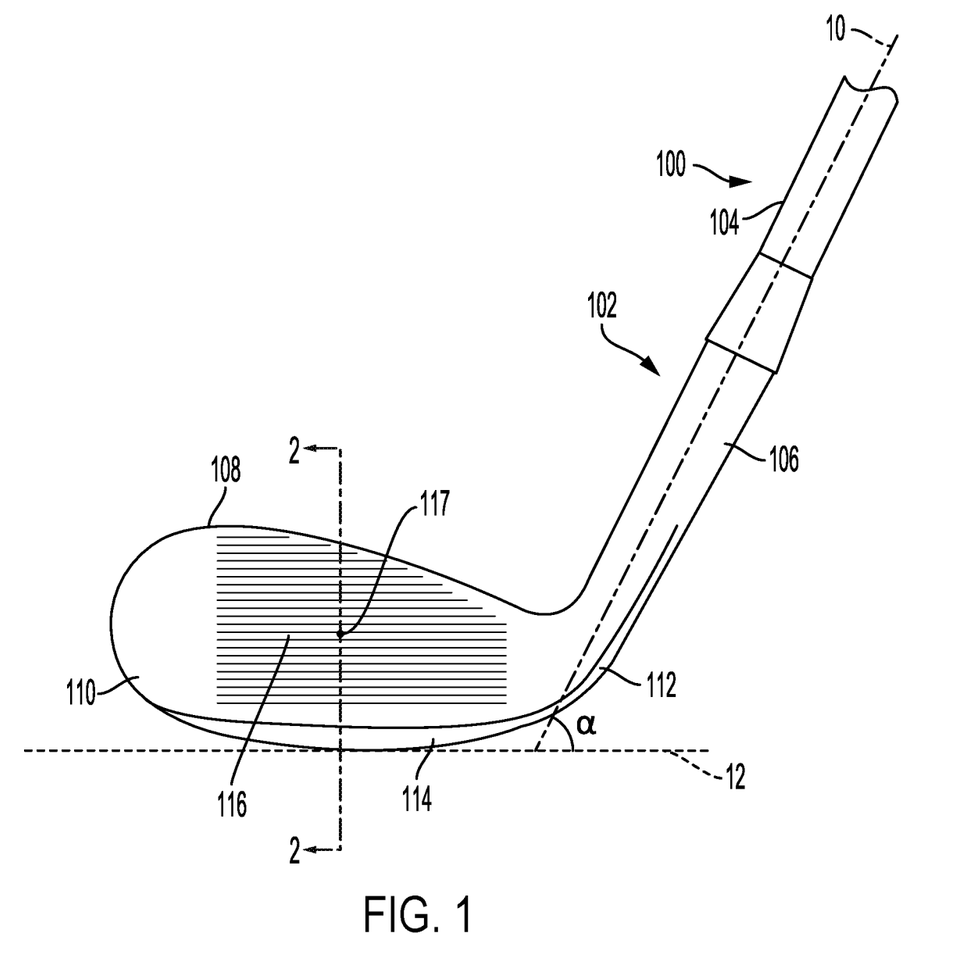
FIG. 1 is a front view of a portion of a golf club according to one or more embodiments.

Since different golfers have different heights, leg lengths, arm lengths, and swings, golf clubs can be fitted or tailored to a particular golfer. One golf club characteristic that can be fitted includes a lie angle of the golf club. As shown in FIG. 1, lie angle α is defined between horizontal ground plane 12 and hosel axis 10 of golf club 100. If a golf club is properly fit to a golfer, when the golf club is swung using their typical swing, at or about the point of ball impact, the sole of the club head will also impact the turf. The sole of the club head should impact the turf at about the middle of the length of the sole in a toe to heel direction (i.e., in a middle portion of sole 114 in FIG. 1 between toe portion 110 and heel portion 112).

Fitting the lie angle of a golf club has conventionally been performed by applying a sole-tape or lie-tape to the sole and having the golfer swing the club to hit a golf ball from a relatively hard surface or a "lie-board" that leaves a mark on the sole-tape. The mark on the sole-tape can show where the sole contacted the surface at or about the time the club head hit the golf ball. Marks located away from the middle portion of the sole can indicate that a different lie angle should be used so that the sole will contact the surface at or closer to the middle portion when the golfer swings the golf club to hit a golf ball.

In addition to a lie angle, golf clubs can also be fitted to a golfer based on a "sole grind" of the club head to better match the angle of attack or steepness of the golfer's swing. The angle of attack of a golf swing can be defined as the vertical direction of a club head's movement at the time of hitting the golf ball with respect to the ground. The sole grind can refer to the shape or contour of the sole from a leading edge of the sole to a trailing edge of the sole to provide different bounce angles. This shape or contour may also be referred to as a "bounce radius" or "sole radius."

Figures 2A, 2B:
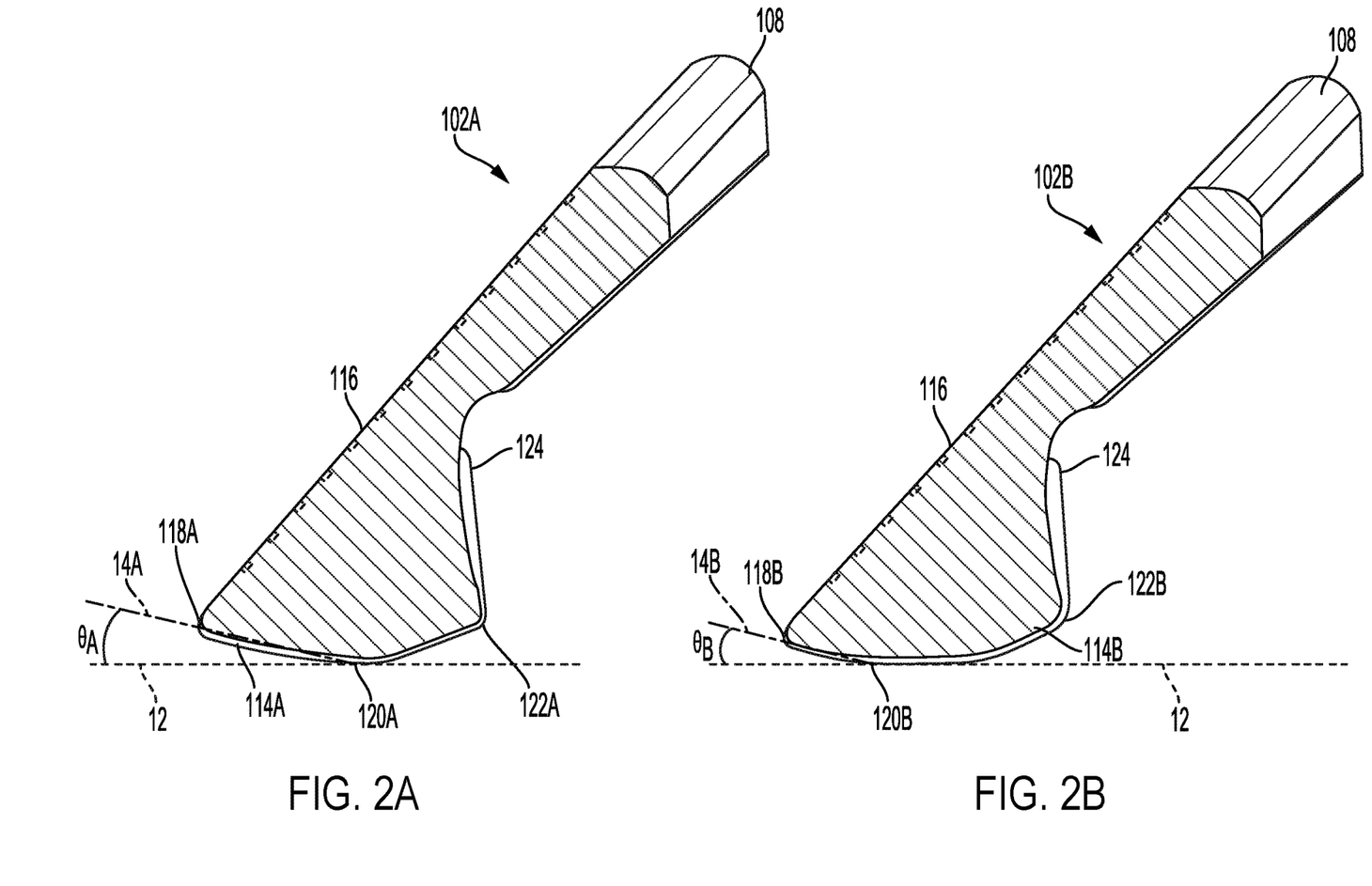
FIG. 2A is a cross-section view of the golf club head of FIG. 1 with a mid-sole grind taken along cross-section line 2 in FIG. 1 according to one or more embodiments.
FIG. 2B is a cross-section view of the golf club head of FIG. 1 with a low-sole grind taken along cross-section line 2 in FIG. 1 according to one or more embodiments.
Figure 2C:
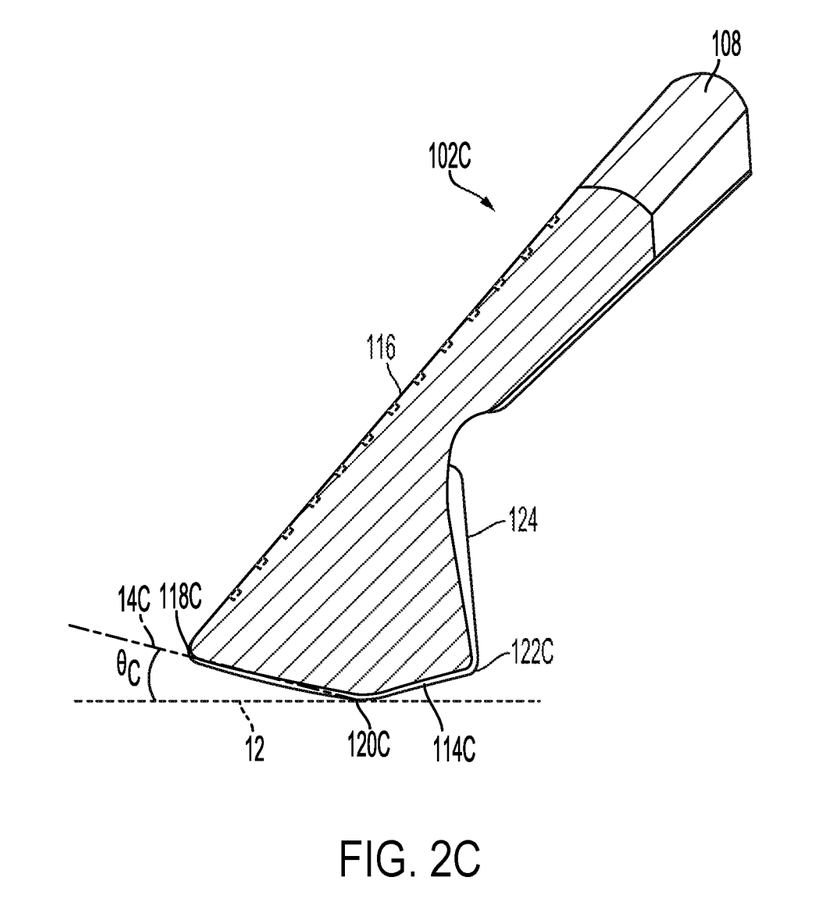
FIG. 2C is a cross-section view of the golf club head of FIG. 1 with a full-sole grind taken along cross-section line 2 in FIG. 1 according to one or more embodiments.

The bounce or bounce angle can be generally thought of as how much lower a trailing portion of a sole of the golf club head is than a leading edge of the sole or the degree to which the sole is inclined relative to a virtual ground plane. The bounce angle ordinarily affects the amount of resistance the golf club head encounters from turf, soil, or sand when swinging the golf club to hit a golf ball. Examples of different bounce angles, θ, are shown in FIGS. 2A, 2B, and 2C with a mid-sole grind, low-sole grind, and full-sole grind, respectively.

Different golf club heads, such as pitching wedges and sand wedges, can have different bounce angles or sole grinds for different ground surface conditions. As noted above, golfers may also benefit from different sole grinds depending on the angle of attack or steepness of their swing toward the golf ball. For example, golfers with a shallow angle of attack in their swing (e.g., 0 to −5.5 degrees with a wedge-type club) may benefit from a lower bounce angle or low-sole grind, where the trailing portion of the sole is lower, while golfers with a steeper angle of attack in their swing (e.g., −9.5 to −16 degrees with a wedge-type club) may benefit from a higher bounce angle or full-sole grind, where the trailing portion of the sole is relatively higher.

The selection or fitting of a sole grind to a particular golfer is conventionally made by observing the size of a divot in turf to determine an angle of attack for the golfer's swing. However, many golf club fitters do not have access to real grass and their operations are sole based indoors on mats. Similarly, golfers may not have sufficient experience evaluating their divots as compared to other golfer's divots on a consistent turf to enable the golfer to select a sole grind. In some cases, a launch monitor may be used to determine the angle of attack of the golfer's swing, but this approach can present challenges due to the cost and setup of launch monitors that can measure angles of attack with sufficient accuracy and precision.

The sole of a club head may be available with different sole grinds or contours from a leading edge of the sole to a trailing edge of the sole to provide different bounce angles. For example, a low-sole grind can be better suited to firmer turf conditions (e.g., fairway shots) and to golfers with a shallower angle of attack by providing a lower bounce angle. A mid-sole grind may provide better all-around performance for varying turf conditions and may be better suited to golfers with a more neutral angle of attack. A full-sole grind can be better suited to softer turf conditions (e.g., sand shots and rough shots) and to golfers with a steeper angle of attack by providing a higher bounce angle. In some cases, the sole may be ground down by a golf club fitter using a grinding tool to change the bounce angle. In other cases, the golf club may be sold with different sole grinds from the manufacturer corresponding to different bounce angles for the same golf club.

BRIEF DESCRIPTION OF DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

FIG. 1 is a front view of a portion of a golf club 100 according to one or more embodiments. As shown in FIG. 1, golf club 100 includes a shaft 104 attached to a hosel 106 of a golf club head 102. The golf club head 102 includes a toe portion 110, a heel portion 112, a topline portion 108, and a sole portion 140. The golf club head 102 also includes a striking face 116 adapted to strike a conventional golf ball. The striking face 116 may be provided with one or more grooves or score lines, which imparts additional spin to the golf ball when struck.

The striking face 116 defines a face plane that includes a face center 117. As used herein, the face center denotes a point on a golf club head's striking face that is midway between the heel-to-toe extents of the striking face score lines and midway between the sole-to-topline extents of the striking face. Golf club head 102 is shown in a "reference position" in FIG. 1 that denotes an orientation of a golf club head in which the sole rests on a virtual ground plane such that the score lines are horizontal.

In FIG. 1, a lie angle, α, of the golf club 100 is defined between horizontal ground plane 12 and hosel axis 10 of the golf club 100. The hosel axis 10 extends axially through the center of the hosel 106. As noted above, the lie angle of a golf club can be fit or selected based on the swing of a particular golfer. When the lie angle of the golf club 100 is properly fit to the golfer's swing, the sole 114 should impact the surface or turf in a middle portion of the sole 114 between toe portion 110 and heel portion 112 (i.e., an area centered about the cross-section line 2 shown in FIG. 1) when the golfer swings the golf club to hit a golf ball.

Fitting the lie angle has conventionally been performed by applying a sole-tape or "lie-tape" to the sole and having the golfer swing the golf club to hit a golf ball from a relatively hard surface or a "lie-board" that leaves a mark on the sole-tape. The mark on the sole-tape can show the portion of the sole that contacted the surface or lie-board at or about the time the club head hit the golf ball. Marks located away from the middle portion of the sole can indicate that a different lie angle should be used so that the golf club head will contact the surface at or closer to the middle portion of the sole when the golfer swings the golf club to hit a golf ball. The present disclosure provides examples of a sole-tape that can be used for both fitting the lie angle and for fitting a sole grind to the golfer's swing.

FIG. 2A is a cross-section view of the golf club head 102 of FIG. 1 with a mid-sole grind taken along cross-section line 2 in FIG. 1 according to one or more embodiments. The sole grind can refer to the shape of the sole from a leading edge to a trailing edge of the sole. This shape may also be referred to as a "bounce radius" or "sole radius." Golf club manufacturers typically make wedge-type golf clubs with different sole grinds (e.g., C-Shaped, V-Shaped, F-Grind, D-Grind) to provide different amounts of bounce. Different manufacturers may use different names for the sole grinds, but generally, the sole grinds correspond to a low bounce category, a medium bounce category, and a high bounce category. A club head may also be modified by a golf club fitter after manufacture by grinding the sole to change the bounce or shape of the sole, such as for a higher lofted iron-type golf club.

The bounce or bounce angle can be generally thought of as how much lower a trailing portion of a sole of the golf club head is than a leading edge of the sole or the degree to which the leading portion of the sole is inclined relative to a virtual ground plane. As noted above, the bounce angle ordinarily affects the amount of resistance the golf club head encounters from turf, soil, or sand when swinging the golf club to hit a golf ball.

The mid-sole grind of FIG. 2A corresponds to a medium bounce category that can be suited for a wider variety of turf conditions as compared to the low-sole grind of FIG. 2B and the full-sole grind of FIG. 2C. In addition, the mid-sole grind of FIG. 2A can be suited for golf swings that have a relatively neutral angle with respect to other golfers using the same golf club.

As shown in FIG. 2A, the bounce angle $\theta_A$ is the angle between virtual sole line 14A and virtual ground plane 12 when golf club head 102A is orientated in the reference position for striking a golf ball. Bounce angle $\theta_A$ is measured in the virtual vertical plane passing through face center 117 (shown in FIG. 1) along a height of striking face 116 and perpendicular to the virtual striking face plane of striking face 116 (i.e., a vertical plane along cross-section line 2 in FIG. 1). Virtual sole line 14A is defined by a line passing through leading edge 118A of sole 114A and ground contact point 120A, which is located in the virtual vertical plane where sole 114A contacts virtual ground plane 12. Leading edge 118A can be where sole 114A connects to striking face 116 and may include a radius or curved edge. Trailing edge 122A can be where sole 114A connects to rear surface 124 and may include a radius or curved edge.

As noted above, a conventional fitting of a sole grind to a particular golfer can include observing a size of a divot in turf to attempt to determine an angle of attack for the golfer's swing. The steeper a swing, the more the face of the club head hits down on the golf ball, which typically results in a larger divot in the turf. Conversely, the shallower a swing, the less the face of the club head hits down on the golf ball, which typically results in a smaller or no divot in the turf. A swing with a relatively neutral angle of attack typically results in a divot size between the divots formed by a steeper angle of attack and a shallower angle of attack for the same turf and golf club.

However, as discussed above, many golf club fitters may not have access to turf to measure the size of a divot and many golfers may not have the experience needed to evaluate the size of different divots on a consistent turf (e.g., the same grass variety mowed at the same height with the same amount of added sand). In addition, launch monitors that can measure the angle of attack with adequate accuracy and precision can be expensive and difficult to set up. The present disclosure provides examples of sole-tapes that can be used to guide a golfer or a fitter in the selection of a sole grind without the need for an expensive launch monitor, a consistent turf, or extensive experience evaluating divots. In addition, the disclosed examples of sole-tapes can streamline the golf club fitting process by including lie angle indicia for simultaneously guiding the selection of a lie angle for the golfer.

Those of ordinary skill in the art will appreciate that the example golf club heads shown in the present disclosure are for the purpose of illustration and that other implementations can include different golf club heads. For example, the sole-tapes of the present disclosure can be used with golf clubs that have different lofts, club head designs, and sole shapes or sizes.

FIG. 2B is a cross-section view of golf club head 102 of FIG. 1 with a low-sole grind taken along cross-section line 2 in FIG. 1 according to one or more embodiments. The low-sole grind of FIG. 2B has a lower bounce or bounce angle $\theta_B$ than the bounce or bounce angle $\theta_A$ of the mid-sole grind of FIG. 2A. Club head 102B in FIG. 2B is generally better suited to firmer turf conditions (e.g., fairway grass) and golf swings with shallower angles of attack than club head 102A in FIG. 2A.

As shown in FIG. 2B, bounce angle $\theta_B$ is the angle between virtual sole line 14B and virtual ground plane 12 when golf club head 102B is orientated in the reference position for striking a golf ball. Bounce angle $\theta_B$ is measured in the virtual vertical plane passing through face center 117 (shown in FIG. 1) along a height of striking face 116 and perpendicular to the virtual striking face plane of striking face 116 (i.e., a vertical plane along cross-section line 2 in FIG. 1). Virtual sole line 14B is defined by a line passing through leading edge 118B of sole 114B and ground contact point 120B, which is located in the virtual vertical plane where sole 114B contacts virtual ground plane 12. Leading edge 118B can be where sole 114B connects to striking face 116 and may include a radius or curved edge. Trailing edge 122B can be where sole 114B connects to rear surface 124 and may include a radius or curved edge.

FIG. 2C is a cross-section view of golf club head 102 of FIG. 1 with a full-sole grind taken along cross-section line 2 in FIG. 1 according to one or more embodiments. The full-sole grind of FIG. 2C has a greater bounce or bounce angle $\theta_C$ than the bounce or bounce angle $\theta_A$ of the mid-sole grind of FIG. 2A. Club head 102C in FIG. 2C is generally better suited to softer turf conditions (e.g., sand, rough) and golf swings with steeper angles of attack than club head 102A in FIG. 2A.

As shown in FIG. 2C, bounce angle $\theta_C$ is the angle between virtual sole line 14C and virtual ground plane 12 when golf club head 102C is orientated in the reference position for striking a golf ball. Bounce angle $\theta_C$ is measured in the virtual vertical plane passing through face center 117 (shown in FIG. 1) along a height of striking face 116 and perpendicular to the virtual striking face plane of striking face 116 (i.e., a vertical plane along cross-section line 2 in FIG. 1). Virtual sole line 14C is defined by a line passing through leading edge 118C of sole 114C and ground contact point 120C, which is located in the virtual vertical plane where sole 114C contacts virtual ground plane 12. Leading edge 118C can be where sole 114C connects to striking face 116 and may include a radius or curved edge. Trailing edge 122C can be where sole 114C connects to rear surface 124 and may include a radius or curved edge.

Figure 3A:
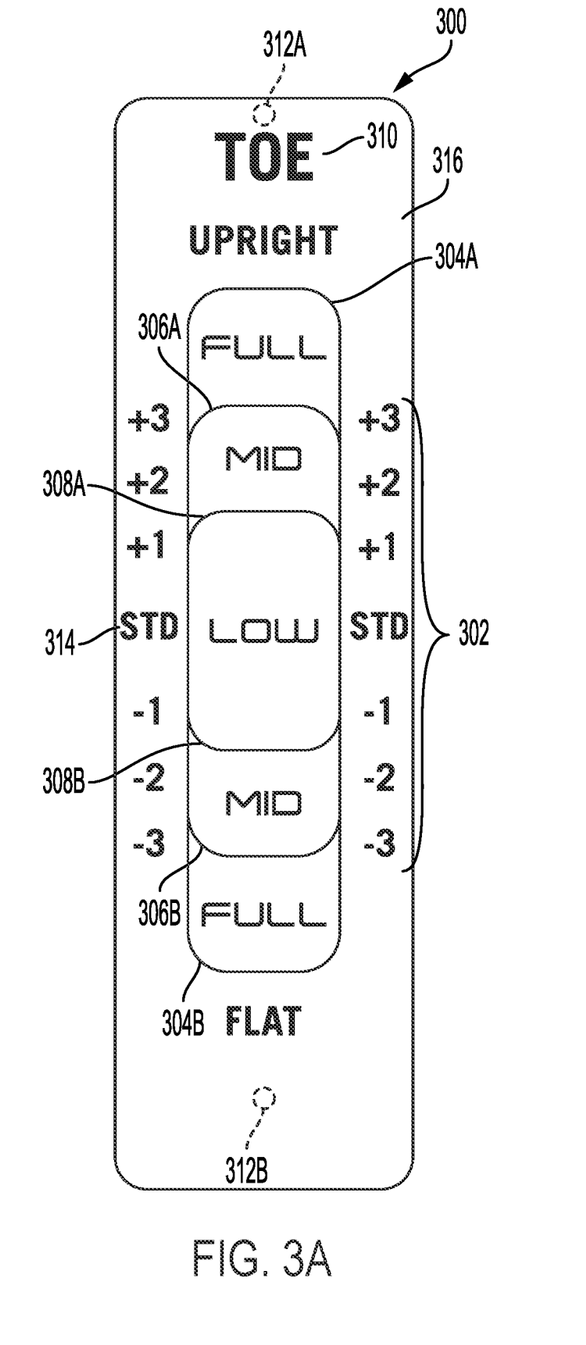
FIG. 3A is a plan view of a sole-tape according to one or more embodiments.
Figure 3B:
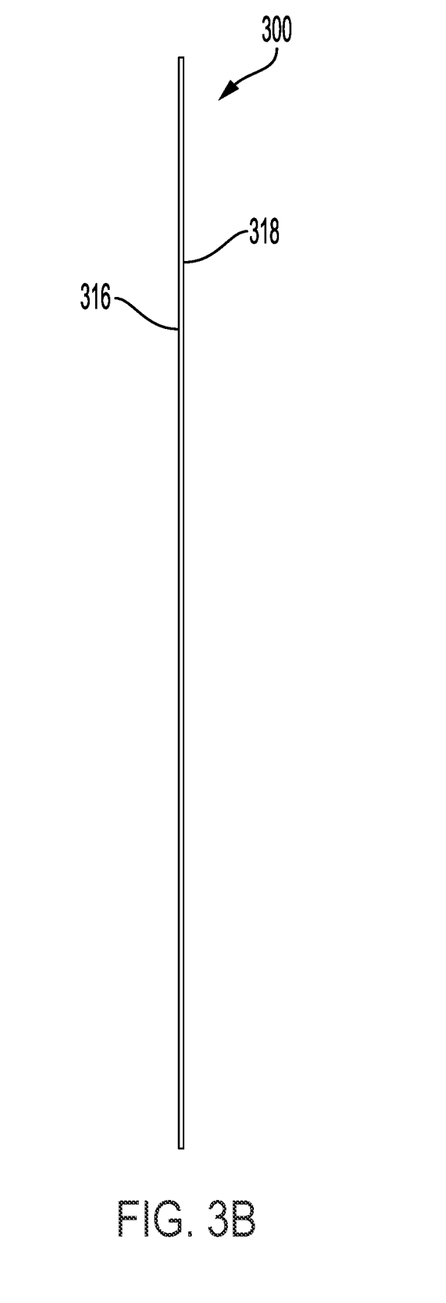
FIG. 3B is a side view of the sole-tape of FIG. 3A according to one or more embodiments.

FIGS. 3A and 3B are a plan view and a side view, respectively, of a sole-tape 300 according to one or more embodiments. The sole-tape 300 can be comprised of a base material or a relatively flat material that substantially corresponds in size and shape to an area of a sole of a golf club head, such as a significant area of sole 114 of club head 102A discussed above. Orientation reference 310 provides a reference for applying or affixing the sole-tape to a sole. In the example of sole-tape 300 in FIG. 3A, the orientation reference 310 (i.e., "TOE" in FIG. 3A) indicates a toe-end portion of the sole-tape 300 that should be placed on a toe portion of the sole. Other implementations may include additional or different orientation references. In addition, the edges of the sole-tape in other implementations may be curved to fit a particular sole area for a certain golf club head.

The base material or substantially flat material can be formed of a material having sufficient integrity to withstand at least one impact with a surface upon which a golf ball may rest as a golf club is swung. In some implementations, the base material or substantially flat material can include a thin film of material, such as a plastic material, which may be either transparent or opaque, and that has an adhesive layer on a reverse-side, major surface 318 (i.e., opposite major surface 316 shown in FIG. 3A). The material may also include a coating on major surface 316 that enables marking on the sole-tape.

The adhesive has sufficient adhesive strength to maintain the sole-tape 300 on the sole of a golf club head throughout at least one golf club swing during which the sole impacts a substantially horizontal surface, such as a lie-board. In other implementations, the sole-tape 300 may not include an adhesive layer but may be affixed to a sole in the field using tape or a glue applied to side 318.

As shown in FIG. 3A, the sole-tape 300 includes grind-indicia to provide a reference for visually evaluating a width of a mark or determining a width classification of a mark formed on the sole-tape 300 by contacting a surface or lie-board during a golf swing. Different portions of the grind-indicia correspond to different sole grinds or sole grind categories for fitting a sole grind to a golfer.

In the example of FIG. 3A, sole-grind indicia 304A and 304B correspond to a full-sole grind, sole-grind indicia 306A and 306B correspond to a mid-sole grind, and sole-grind indicia 308A and 308B correspond to a low-sole grind. The grind-indicia outline concentric areas or provide brackets on the sole-tape 300 corresponding to the different sole-grinds indicated within the areas or brackets. As shown in FIG. 3A, sole-grind indicia 304A and 304B form a first pair of indicia that are substantially equidistant from a middle portion of the sole-tape 300 that corresponds to a standard lie angle for a golf club that is between a flat lie angle and an upright lie angle (i.e., the middle portion of the sole-tape corresponding to the "STD" lie angle index 314). Similarly, sole-grind indicia 306A and 306B form a second pair of indicia that are substantially equidistant from the middle portion of the sole-tape 300, and sole-grind indicia 308A and 308B form a third pair of indicia that are substantially equidistant from the middle portion of the sole-tape 300.

Sole-tape 300 in FIG. 3A also includes lie-indicia 302 along longitudinal edge portions of major surface 316. The lie-indicia 302 can indicate degrees or an amount of offset from a standard lie angle (e.g., α in FIG. 1). The lie-indicia of sole-tape 300 may differ from the lie-indicia of conventional lie-tape in that the lie-indicia 302 of the sole-tape 300 has been moved toward the longitudinal edges of the sole-tape to make room for the grind-indicia of the sole-tape 300.

In the example of FIG. 3A, the sole-tape 300 provides an indication of "FLAT" towards a heel portion of the sole-tape 300 and an indication of "UPRIGHT" towards a toe portion of the sole-tape 300. When the middle of a mark formed on the sole-tape 300 from impacting a surface during a golf swing is offset from the "STD" lie angle index in the positive direction (i.e., +1, +2, +3), the golfer's swing is considered to have an upright lie, assuming the golf club head has a standard lie angle. A golf club with a smaller lie angle may then be recommended for the golfer to compensate for the upright lie.

Alternatively, when the middle of a mark formed on the sole-tape 300 from impacting a surface during a golf swing is offset from the "STD" lie angle index in the negative direction (i.e., −1, −2, −3), the golfer's swing is considered to have a flat lie, assuming the golf club head has a standard lie angle. A golf club with a greater lie angle may then be recommended for the golfer to compensate for the flat lie.

The sole-tape 300 also includes optional visual indicators 312A and 312B that can be used by an electronic device to, for example, determine whether an image or a scan of the sole-tape 300 is acceptable by identifying the visual indicators in the image or scan. In some implementations, a visual indicator can include, for example, a Quick Response (QR) code, a logo, or an American Standard Code for Information Interchange (ASCII) character. The visual indicator or indicators may be analyzed to determine whether qualities of the image or scan, such as size, focus, contrast, or brightness, are sufficient for discerning a mark in the image or scan.

Additionally or alternatively, one or more visual indicators can be used to perform at least one of reorientating or resizing a mark in the image or scan. For example, visual indicators 312A and 312B can be used by the electronic device to reorientate and/or resize the mark in the image or scan relative to a virtual longitudinal line (with respect to the sole-tape 300) between visual indicators 312A and 312B. The mark in the image or scan may also be reorientated and/or resized with respect to another pair of visual indicators on the sole-tape 300, such as relative to a virtual horizontal line (with respect to the sole-tape 300) between the "STD" lie angle indicia. In this regard, one or more visual indicators on the sole-tape 300 can be used for multiple functions, such as for resizing and/or reorientating an image or scan of the sole-tape 300, for aligning the placement of the sole-tape 300 on a sole (e.g., as an orientation reference), and/or for determining a recommended lie angle and/or recommended sole grind (e.g., as a grind-index or as a lie-index).

Those of ordinary skill in the art will appreciate with reference to the present disclosure that other implementations of sole-tape 300 can have different sizes or shapes to better fit the soles of particular club heads. As another example variation, different implementations of sole-tape 300 can include different indicia for grind or lie, such as with straight or curved lines for the grind-indicia instead of concentric areas or brackets, or a different number of grind-indicia or lie-indicia than shown in FIG. 3A.

Figure 4:
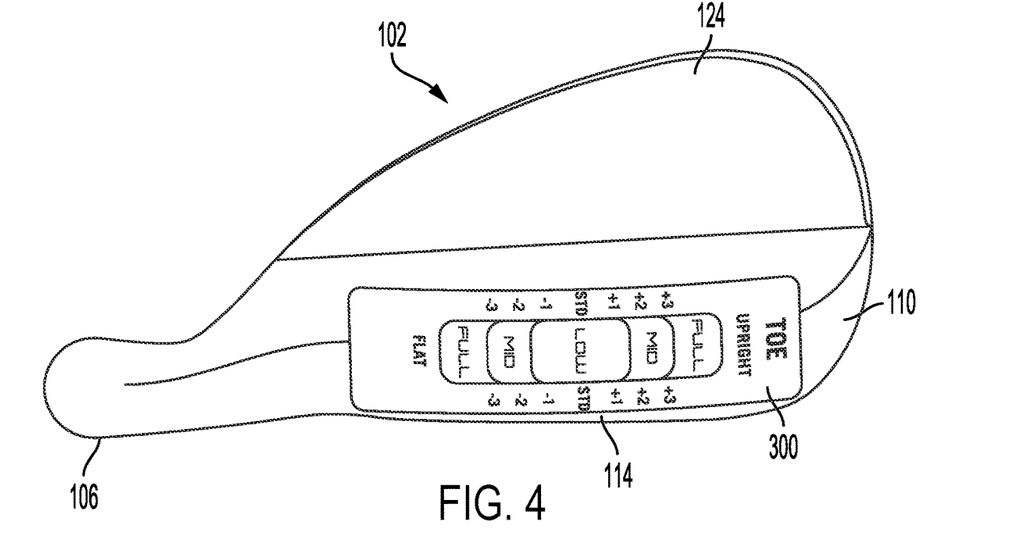
FIG. 4 is a bottom view of the golf club head of FIG. 1 with the sole-tape of FIG. 3 affixed to the sole of the golf club head according to one or more embodiments.

FIG. 4 is a bottom view of golf club head 102 with the sole-tape 300 affixed to the sole 114 according to one or more embodiments. As shown in FIG. 4, the sole-tape 300 is applied or affixed to the sole 114 such that the sole-tape 300 covers a significant or substantial portion of the sole 114 with a longitudinal edge of the sole-tape being substantially parallel to the striking face. In addition, the sole-tape 300 is positioned so that the toe portion of the sole-tape 300 (i.e., the end of the sole-tape 300 with the "TOE" orientation reference) is located on a toe portion of the sole 114. The sole-tape is also positioned so that the middle portion of the sole-tape 300, corresponding to the standard lie angle (i.e., the middle portion of the sole-tape corresponding to the "STD" lie-index) is positioned approximately at a center location of the sole 114 in a toe to heel direction.

Figure 5A:
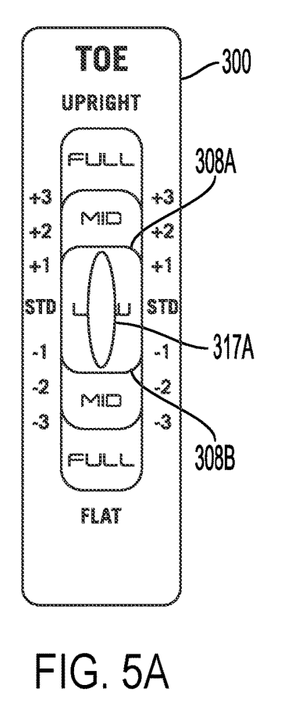
FIG. 5A illustrates a mark formed on a sole-tape corresponding to a recommended low-sole grind-indicia according to one or more embodiments.

FIG. 5A shows a mark 317A formed on the sole-tape 300 after contacting or impacting a surface, such as a lie-board, during a golf swing. As shown by the grind-indicia 308A and 308B, the width or width classification of the mark 317A corresponds to a recommended low-sole grind, as in the example of club head 102B in FIG. 2B discussed above. As used herein, the width of a mark formed on a sole-tape is measured in a longitudinal dimension of the sole-tape (e.g., between the "UPRIGHT" and "FLAT" lie-indicia in FIG. 5A). The width or width classification of the mark 317A corresponds to a divot size that would be formed if the golf club were swung on turf and indicates a swing with a shallow angle of attack.

Figure 5B:
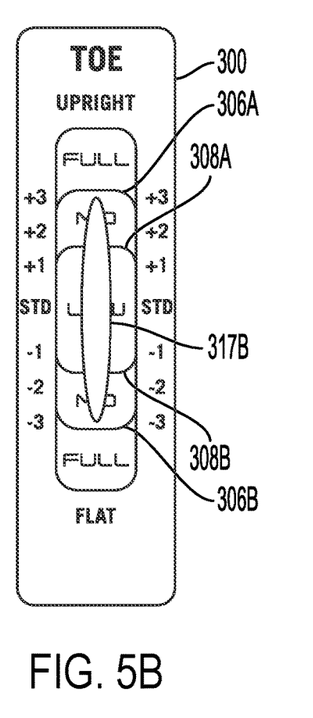
FIG. 5B illustrates a mark formed on a sole-tape corresponding to a recommended mid-sole grind-indicia according to one or more embodiments.

FIG. 5B shows a mark 317B formed on the sole-tape 300 after contacting or impacting a surface, such as a lie-board, during a golf swing. As shown by the grind-indicia 306A and 306B, the width or width classification of the mark 317B corresponds to a recommended mid-sole grind, as in the example of club head 102A in FIG. 2A discussed above. The width or width classification of the mark 317B corresponds to a divot size that would be formed if the golf club were swung on turf and can indicate a swing with a neutral angle of attack.

Figure 5C:
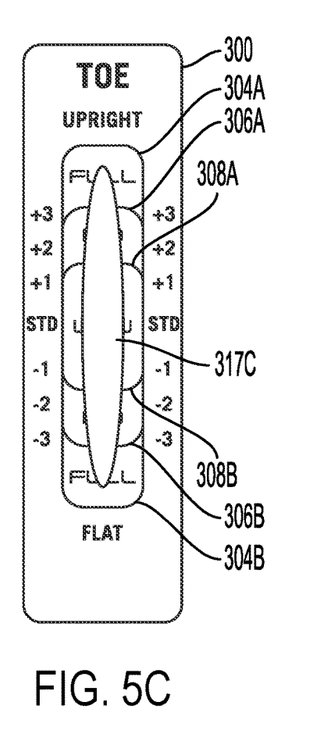
FIG. 5C illustrates a mark formed on a sole-tape corresponding to a recommended full-sole grind-indicia according to one or more embodiments.

FIG. 5C illustrates a mark 317C formed on the sole-tape 300 after contacting or impacting a surface, such as a lie-board, during a golf swing. As shown by the grind-indicia 304A and 304B, the width or width classification of the mark 317C corresponds to a recommended full-sole grind, as in the example of club head 102C in FIG. 2C discussed above. The width or width classification of the mark 317C corresponds to a divot size that would be formed if the golf club were swung on turf and can indicate a swing with a steep angle of attack.

In the examples of FIGS. 5A to 5C, the marks 317 are formed in a lie angle position indicating that no adjustment is recommended for the lie angle of the golf club. In other words, each of the marks 317 in the examples of FIGS. 5A to 5C are substantially centered near the standard lie indicator in a middle portion of the sole-tape. The examples of marks 319 in FIGS. 6A to 6C differ in that they are not substantially centered near the standard lie indicator of the sole-tape. In this regard, the sole-tape 300 can be used to simultaneously evaluate both the lie angle and the sole grind of the golf club with respect to the golfer's swing.

Figure 6A:
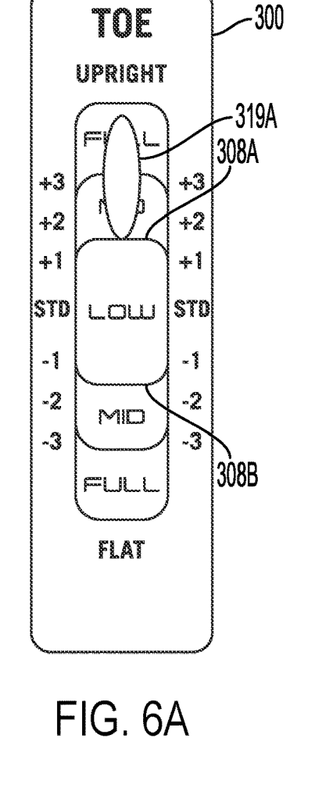
FIG. 6A illustrates an off-center mark formed on a sole-tape with a width corresponding to a recommended low-sole grind according to one or more embodiments.
Figure 6B:
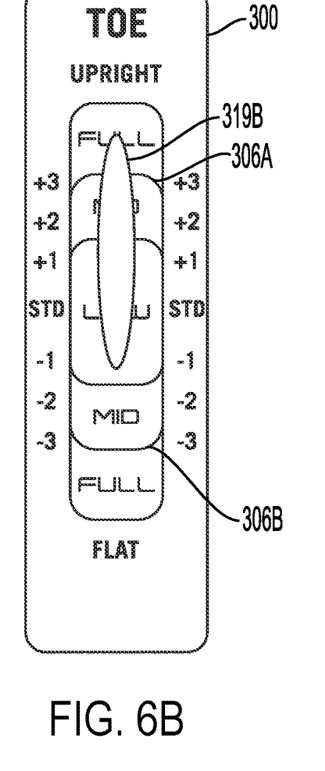
FIG. 6B illustrates an off-center mark formed on a sole-tape with a width corresponding to a recommended mid-sole grind according to one or more embodiments.
Figure 6C:
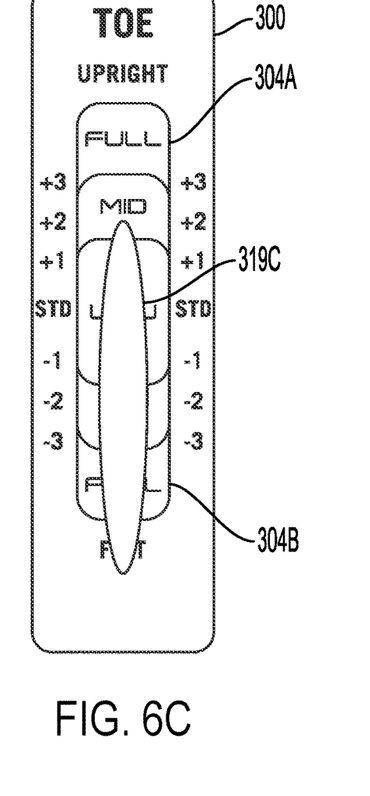
FIG. 6C illustrates an off-center mark formed on a sole-tape with a width corresponding to a recommended low-sole grind according to one or more embodiments.

In the examples of FIGS. 6A to 6C, the grind-indicia still provide a reference for evaluating the width or a width classification for the marks 319, even though the marks 319 are not substantially centered in a middle portion of the sole-tape 300 in a longitudinal direction of the sole-tape (i.e., an offset in an up or down direction in FIGS. 6A to 6C). As shown in FIG. 6A, mark 319A formed on the sole-tape 300 is not centered in the middle portion of sole-tape 300, but the width or width classification of the mark 319A can still be evaluated using the grind-indicia provided on the sole-tape 300.

In the example of FIG. 6A, the recommended sole grind corresponds to a low-sole grind since the width of the mark 319A would fit within the area or brackets of the sole-grind indicia 308A and 308B if centered in the middle portion of the sole-tape 300. In the example of FIG. 6B, the recommended sole grind corresponds to a mid-sole grind since the width of the mark 319B would fit within the area or brackets of the sole-grind indicia 306A and 306B if centered in the middle portion of the sole-tape 300. In the example of FIG. 6C, the recommended sole grind corresponds to a full-sole grind since the width of the mark 319C would fit within the area or brackets of the sole-grind indicia 304A and 304B if centered in the middle portion of the sole-tape 300.

In addition, since the grind-indicia of the sole-tape 300 extends substantially across a horizontal portion (with respect to the sole-tape 300), the width or width classification can be evaluated using the grind-indicia on the sole-tape 300 even when the marks are off-center from a horizontal center of the sole-tape (i.e., with a left or right offset in the examples of FIGS. 5A to 6C).

Figure 7:
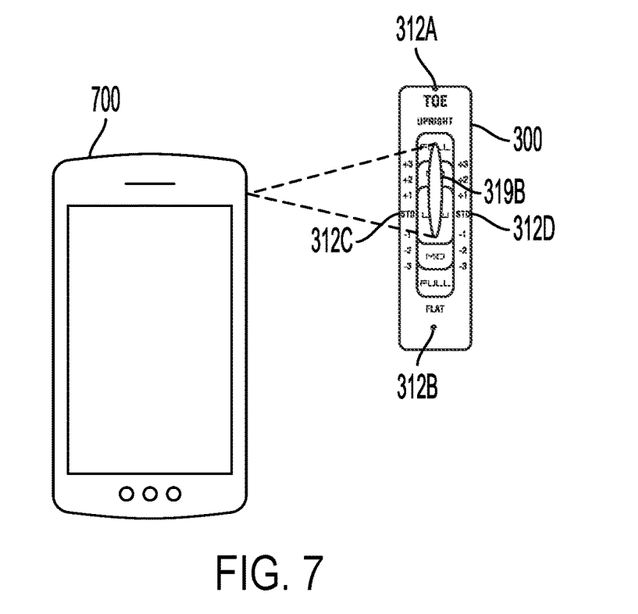
FIG. 7 illustrates the use of an electronic device to capture an image of a sole-tape including a mark according to one or more embodiments.

FIG. 7 illustrates the use of an electronic device to take an image or scan of the sole-tape 300 including the mark 319B according to one or more embodiments. As shown in FIG. 7, the electronic device 700 can include, for example, a smartphone that can capture an image or scan of the sole-tape 300 to determine a recommended lie angle and/or a recommended sole grind based on the mark 319B identified in the image or scan of the sole-tape. The image or scan of the sole-tape can be taken with the sole-tape 300 affixed to the sole of a club head or after removal of the sole-tape from the club head. As discussed above, the mark 319B can be formed by an impact with a surface by the club head during a golf swing.

In the example of FIG. 7, the electronic device 700 can use visual indications 312A, 312B, 312C, and 312D to determine whether the image or scan is acceptable for evaluating the mark 319B. This can include, for example, determining whether each of the visual indications is discernable in the image or scan. In addition, the electronic device 700 can use the visual indications to resize and reorientate the mark 319B in the image or scan to determine a width or width classification of the mark 319B and a relative location of the mark 3196 with respect to the sole-tape 300.

In this regard, the electronic device 700 may determine an offset of the mark 319B from a middle portion or center of the sole-tape. As discussed in more detail below, the electronic device 700 may then use the determined offset and width of the mark 319B to correlate these values with a recommended lie angle and a recommended sole grind to be output on a user interface of the electronic device 700. The use of an electronic device, such as a smartphone, can allow golfers to perform their own lie and grind fittings, even if the golfer does not have access to golf clubs with different lie angles to center the mark formed on the sole-tape.

Figure 8:
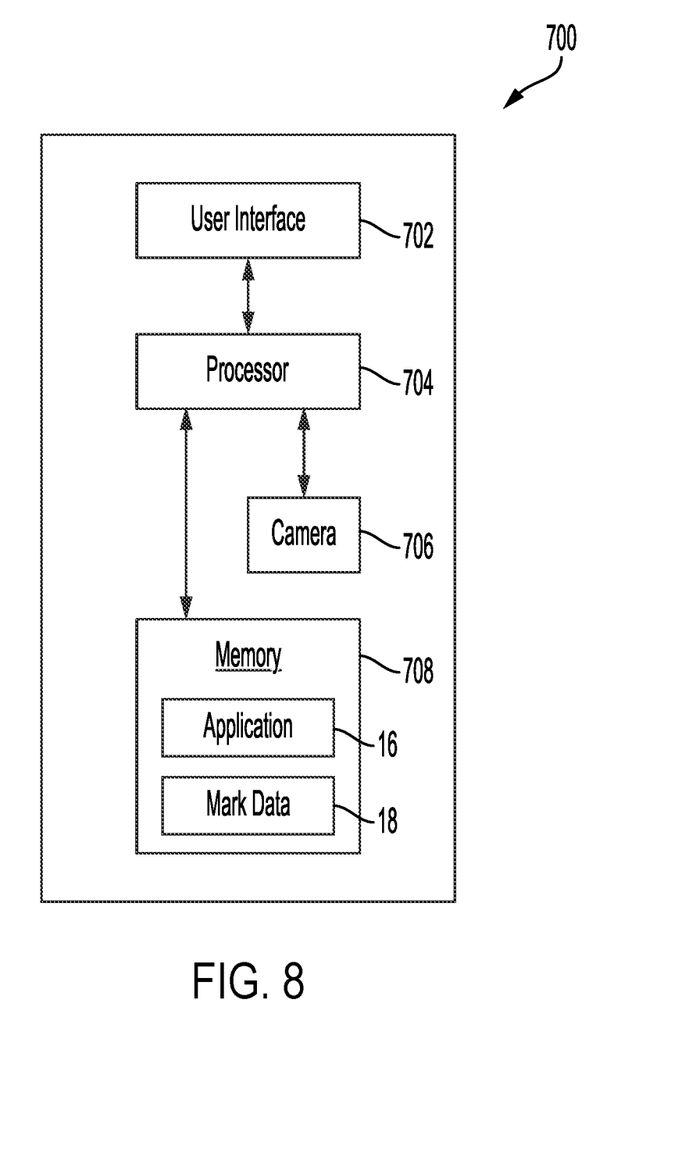
FIG. 8 is a block diagram of an electronic device configured to determine a recommended sole grind and a recommended lie angle using an image or scan of a sole-tape including a mark according to one or more embodiments.

FIG. 8 is a block diagram of an electronic device 700 configured to determine a recommended sole-grind using an image or scan of a sole-tape including a mark according to one or more embodiments. Electronic device 700 can include, for example, a portable electronic device, such as a smartphone, a laptop, or a tablet. In other implementations, electronic device 700 can include a desktop computer or dedicated hardware for evaluating a mark on a sole-tape.

As shown in FIG. 8, electronic device 700 includes a camera 706 configured to capture an image or scan of a sole-tape. A user of the electronic device 700 can provide user input for an application 16 executed by processor 704 and receive output from the application 16 via the user interface 702. The user interface 702 can include, for example, a touchscreen display or a screen and a keyboard and/or a pointing device. As discussed in more detail below with reference to the process of FIG. 9, the output of application 16 can include a recommended lie angle and a recommended sole grind based on the width and location of a mark on the sole-tape as determined by analyzing an image or scan captured by the camera 706.

The processor 704 can include, for example, circuitry such as one or more processing cores or other type of Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, the processor 704 may be combined with memory 708 to form a System on a Chip (SoC) or other processing unit.

Memory 708 can include, for example, Dynamic Random Access Memory (DRAM) or another type of solid-state memory, such as a Storage Class Memory (SCM) or a non-volatile flash memory. In some implementations, memory 708 can include a Hard Disk Drive (HDD) or a Solid-State Drive (SSD). In the example of electronic device 700 in FIG. 8, the memory 708 stores application 16, which includes computer-executable instructions that can be executed by the processor 704 to perform a sole grind and lie angle recommendation process, as discussed in more detail below with reference to FIG. 9. In this regard, the processor 704 can load instructions for execution from the memory 708, such as portions of application 16, and can access data stored in memory 708, such as mark data 18, for performing the disclosed sole grind and lie angle recommendation processes.

Mark data 18 can include, for example, mark sizing and location data for determining a width or width classification of a mark in an image or scan of a sole-tape. In addition, mark data 18 can include one or more data structures that correlate at least one of a mark width and a mark location (e.g., a calculated offset of a mark from a center location of a sole-tape) to a recommend lie angle and/or a recommend sole grind. In other implementations, the mark data 18 can include one or more formulas that relate the mark width and the mark location to a recommended lie angle and/or a recommended sole grind. The data included in the one or more data structures or the coefficients and/or constants in the function or functions that correlate the determined mark width and mark offset to a recommended lie angle and/or a recommended sole grind can be empirically determined based on extensive testing of the changes in mark size based on different locations of the mark on the sole-tape.

It will be appreciated by those of ordinary skill in the art with reference to the present disclosure that other implementations of the electronic device 700 may differ. For example, some or all of application 16, mark data 18, and/or processor 704 may be located on a different device, such as at a remote server accessed via a network by the electronic device, such as in an example where application 16 is provided as a cloud service. As yet another variation, camera 706 may be a separate device that may provide the image or scan of the sole-tape to the electronic device 700 or a remote processor via a network.

Figure 9:
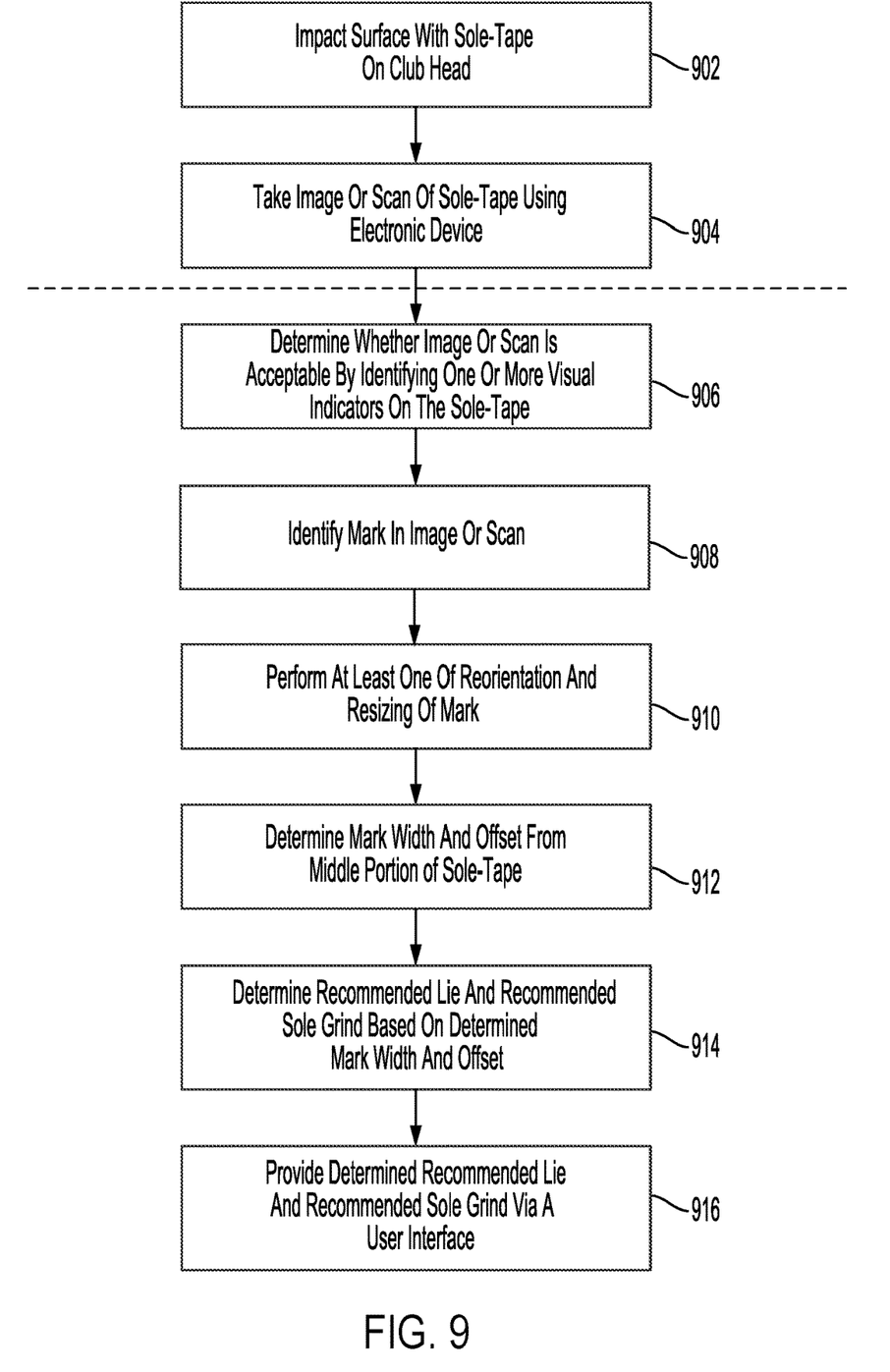
FIG. 9 is a flowchart for a sole grind and lie angle recommendation process using an electronic device according to one or more embodiments.

FIG. 9 is a flowchart for a sole grind and lie angle recommendation process using an electronic device according to one or more embodiments. The process of FIG. 9 can be performed, for example, in part by a golfer and in part by an electronic device, such as electronic device 700 in FIG. 8 where processor 704 executes instructions from an application 16.

In block 902, the golfer impacts a surface, such as a lie-board or other relatively firm surface, with the sole-tape affixed to the sole of a golf club during a golf swing. As discussed above, the sole-tape is configured to form a mark from the impact that corresponds to a divot size that would result from the golf club swing on turf.

In block 904, the golfer or a golf club fitter takes an image or a scan of the sole-tape with the mark formed in block 902. In some implementations, this can include the golfer taking a photo of the sole-tape either still on the club head or removed from the club head using a portable electronic device, such as a smartphone.

Blocks 906 to 916 below the dashed line in FIG. 9 can be performed by the electronic device, as opposed to the performance of blocks 902 and 904 by the golfer or golf club fitter. In block 906, the processor of the electronic device determines whether the image or scan taken in block 904 is acceptable by identifying one or more visual indicators in the image or scan. With reference to FIG. 7 discussed above, the one or more visual indicators can include visual indicators 312 that are used by the processor to determine whether the visual indicators in the image or scan can be discerned from, for example, a background of the sole-tape. If not, the image or scan may not be of a sufficient quality (e.g., size, focus, contrast, or brightness) to identify the mark and visual indicators used to determine a size and location of the mark.

In response to determining that the image or scan is of a sufficient quality in block 906, the processor in block 908 identifies the mark in the image or scan. In some implementations, the processor may identify the mark by locating areas or blocks of high contrast in the image or scan, such as adjacent pixels having a contrast greater than a threshold contrast.

In block 910, the processor performs at least one of reorientating and resizing the mark identified in the image or scan. In some implementations, the mark may be resized by comparing a longitudinal distance (with respect to the sole-tape orientation) in terms of pixels of the mark in the image or scan to a longitudinal distance in terms of pixels between two identified visual indications in the image or scan (e.g., a representation in the image or scan of a virtual line between visual indicators 312A and 312B in FIG. 7). The resizing can facilitate a standardization of the mark's size since the images or scans may be taken at varying angles or distances from the sole-tape. A similar resizing may also be performed in some implementations in a horizontal direction with respect to the sole-tape.

The mark may be reorientated in some implementations in block 910, such as where the sole-tape in the image or scan is upside down or at an angle that would affect the determination of a width and offset of the mark from the middle portion of the sole-tape. In this regard, one or more visual indicators, such as the longitudinal and/or horizontal visual indicators discussed above for resizing the mark, can be used to determine references for the longitudinal and/or horizontal orientation of the sole-tape in the image or scan.

In block 912, the processor determines the mark width and the offset of the mark from a middle portion of the sole-tape. As discussed above with reference to the sole-tape example of FIG. 3A, the middle portion of the sole-tape can correspond to a standard lie angle for a golf club between a flat lie angle and an upright lie angle. In some implementations, the processor may determine an approximate center of the mark in the image or scan and calculate a difference of the mark's center in either a flat lie direction or an upright lie direction on the sole tape from the middle portion to determine the offset of the mark.

In block 914, the processor determines a recommended lie and a recommended sole grind based on the determined mark width and mark offset. In some implementations, the processor may use one or more formulas or functions to correlate the mark width and the mark offset to the recommended lie and the recommended sole grind. In this regard, the size of the mark may vary somewhat depending on the location the mark on the sole-tape for the same angle of attack. In addition to providing a recommended lie angle, the correlation of the offset of the mark can account for the relative location of the mark to reduce error in recommended sole grind due to the varying size of the mark based on its location.

The correlation may be performed by using one or more data structures and/or formulas that are derived from empirical data collected for a variety of golf swings with different golf clubs by different golfers, resulting in a variety of mark sizes and mark locations on sole-tapes. In some implementations, the processor may receive user input in the form of a particular golf club to be fitted (e.g., model number or loft), characteristics of the golfer such as a height, arm length, or whether the golfer is left-handed or right-handed, and/or characteristics about the surface, such as a type of material of the surface. One or more of these variables may also be considered in addition to the mark width and the offset to determine the recommended lie angle or sole grind.

In block 916, the processor outputs the recommended lie angle and the recommended sole grind via a user interface of the electronic device. The golfer or golf club fitter may then use these recommendations in selecting a golf club for the golfer based on their swing.

Those of ordinary skill in the art will appreciate with reference to the present disclosure that other embodiments of the process of FIG. 9 may differ. For example, in some embodiments, the determination of the recommended sole grind may be made solely based on a determined mark width, without considering the offset of the mark from a middle portion of the sole-tape. As another example variation, the processor in block 914 may only determine a recommended sole grind, without determining the recommended lie angle. As yet another example variation, the golfer may input information about the golfer and/or the golf club for consideration in determining the recommended sole grind and/or recommended lie angle.

The foregoing examples of the disclosed sole-tapes and methods of using such sole-tapes improve the golf club fitting process by providing a uniform and more accurate way of measuring the ground contact of the sole during the golfer's swing than observing a divot size in turf without the expense and complicated setup of a sophisticated launch monitor. In addition, the disclosed sole-tapes can be used in situations where the golfer or fitter may not have access to turf or to a consistent turf for purposes of making and evaluating divots. The use of the disclosed sole-tapes also provides a visual reference that can be used by golfers who may not have experience evaluating the size of divots on different types of turf.

In another aspect the disclosed sole-tapes and methods streamline the fitting process by providing a single indication resulting from a single swing that corresponds to both the recommended lie angle and the recommended sole grind. In yet another aspect, the use of an electronic device as discussed above to evaluate the mark can result in more accurate sole grind recommendations, despite a golfer not having experience evaluating divots for sole grind or golf clubs that have different lie angles to standardize the location of the mark.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the scope of the present disclosure. For example, some alternative embodiments may include different sizes or shapes of sole-tapes or different grind-indicia and/or lie-indicia on the sole-tape. Accordingly, the described embodiments are to be considered in all respects only as illustrative and not restrictive, and the scope of the disclosure is, therefore, indicated by the following claims rather than by the foregoing description. All changes which come within the meaning and range of equivalency of the claims are to be embraced within their scope. The described embodiments are to be considered in all respects only as illustrative and not restrictive. In addition, the use of language in the form of "at least one of A and B" in the following claims should be understood to mean "only A, only B, or both A and B."

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer-readable medium which causes processor to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, applications, and processors described in connection with the examples disclosed herein may be implemented or performed with a general-purpose processor, a GPU, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as, a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM, flash memory, Read Only Memory (ROM) memory, Erasable Programmable ROM (EPROM) memory, registers, a hard disk, a removable media, an optical media, or any other form of non-transitory, computer-readable storage medium known in the art. An exemplary computer-readable storage medium is coupled to a processor such that the processor can read information from, and write information to, the storage medium. In the alternative, the storage medium may be integral to processor circuitry. The processor and the storage medium may reside, for example, in an ASIC or an SoC.

What is claimed is:

1. A method, comprising:
    impacting a surface with a golf club head during a golf swing, wherein the golf club head includes a sole with a sole-tape affixed on the sole, and wherein the impact of the surface forms a mark on the sole-tape;
    taking an image or a scan of the sole-tape using an electronic device; and
    using the electronic device to determine a recommended sole grind based on the image or scan of the sole-tape including the mark.

2. The method of claim 1, further comprising determining, by the electronic device, whether the image or scan is acceptable by identifying one or more visual indicators on the sole-tape in the image or scan.

3. The method of claim 1, further comprising performing, by the electronic device:
    identifying the mark in the image or scan; and
    at least one of reorientating and resizing the mark in the image or scan.

4. The method of claim 1, further comprising determining, by the electronic device, a width of the mark and an offset of the mark from a middle portion of the sole-tape using the image or the scan.

5. The method of claim 4, further comprising determining, by the electronic device, a recommended lie angle and the recommended sole grind based on the determined width and offset of the mark.

6. The method of claim 4, further comprising using, by the electronic device, at least one of one or more formulas and one or more data structures to correlate the determined width and offset of the mark to the recommended lie angle and the recommended sole grind.

7. A non-transitory computer-readable medium storing computer-executable instructions, wherein when the computer-executable instructions are executed by a processor of an electronic device, the computer-executable instructions cause the processor to:
    identify a mark in an image or scan of a sole-tape configured to be affixed to a sole of a golf club head, wherein the mark is formed by the sole-tape impacting a surface;
    determine a width of the mark and an offset of the mark from a middle portion of the sole-tape;
    determine a recommended lie angle and a recommended sole grind based on the determined width and offset of the mark; and
    output the recommended lie angle and the recommended sole grind via a user interface of the electronic device.

8. The non-transitory computer-readable medium of claim 7, wherein when the computer-executable instructions are executed by the processor, the computer-executable instructions further cause the processor to at perform at least one of reorientating and resizing the mark in the image or scan.

9. The non-transitory computer-readable medium of claim 7, wherein when the computer-executable instructions are executed by the processor, the computer-executable instructions further cause the processor to use at least one of one or more formulas and one or more data structures to correlate the determined width and offset of the mark to the recommended lie angle and the recommended sole grind.

* * * * *